Figures 1, 2:
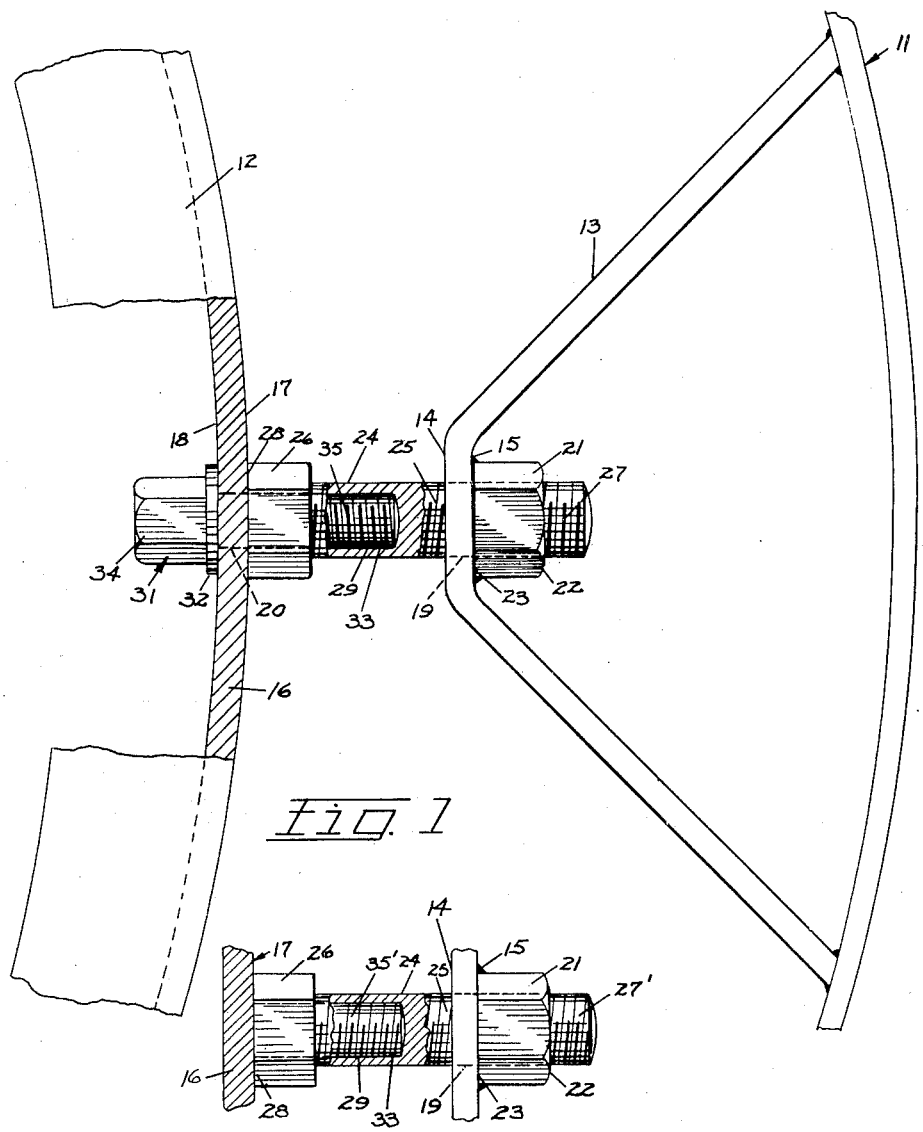

Nov. 15, 1949     R. KARVIS     2,487,811

FASTENER

Filed Aug. 13, 1946

INVENTOR.
RAYMOND KARVIS

BY

ATTORNEY

Patented Nov. 15, 1949

2,487,811

UNITED STATES PATENT OFFICE 2,487,811

FASTENER

Raymond Karvis, Philadelphia, Pa.

Application August 13, 1946, Serial No. 690,197

3 Claims. (Cl. 287—62)

(Granted under the act of March 3, 1883, as amended April 30, 1928; 370 O. G. 757)

The invention described herein may be manufactured and used by or for the Government of the United States of America for governmental purposes without the payment of any royalties thereon or therefor.

This invention relates to a fastener that can be operated for precisely adjusting the distance between two members and for locking the members in adjusted relation.

A conventional construction for making precise adjustment of the distance between two members such as a supporting bracket and a member supported thereon comprises a series of shims for spacing the members with precision in predetermined relation and a standard nut and bolt assembly for locking the members and shims in assembled relation. Selection of the correct number of shims to effect the predetermined spacing is a trial-and-error procedure and necessitates disassembly of the nut and bolt for changing the shims when a new adjustment is found to be necessary. This invention offers a construction that can be operated for adjusting the distance between two members without removal of any parts, and for locking the members in such adjusted relation.

This invention is successful in adjusting and locking the firing-cut-out cam track on gun turrets in which a precise adjustment, which must be held in spite of heavy vibrations, is necessary between the supporting bracket and the cam track.

An object of this invention is to provide a fastener that can be operated for securing together members in a predetermined spaced relation.

Another object is to provide a fastener that can be operated for securing together a pair of members in such manner that the members are disposed with precision in a predetermined spaced relationship and are locked against relative movement.

Further objects and advantages of this invention, as well as its construction, arrangement, and operation, will be apparent from the following description and claims in connection with the accompanying drawing, in which:

Fig. 1 shows a preferred form of the invention, partly in section and partly in elevation; and Fig. 2 is a fragmentary view of another form of the invention, partly in section and partly in elevation.

In Fig. 1 there is shown a supporting member 11 for a gun-turret firing-cut-out cam track 12. Member 11 includes a substantially U-shaped bracket 13 having a reference face 14 and inner face 15. Bracket 13 has cut through it an opening 19 which is substantially centrally located relative to face 14. Member 12 has a flange 16 provided with a reference face 17 and inner face 18. Through member 12 there is an opening 20 which is positioned so that it may be aligned on the same axis as opening 19 in member 13. The required distance between reference faces 14 and 17 is predetermined and it is necessary that faces 14 and 17 be precisely spaced in such predetermined relation and that members 11 and 12 be locked in such relation against misadjustment in spite of accidental movement or vibrations.

Rigidly affixed to face 15 of member 13 is a hexagonal nut 21, having ends 22 and 23. End 23 abuts face 15 of member 13 and is rigidly secured to it by welding or other suitable means. Nut 21 is disposed coaxially with opening 19 in bracket 13.

Through nut 21 is threaded a spacing bolt 24 which is a hexagonal head bolt comprising a threaded shank 25 having at one end a hexagonal head 26. Bolt 24 is positioned so that head 26 is disposed in proximity to cam track 12, and shank 25 extends through bracket opening 19 and nut 21. Threads 27 of shank 25 have a pitch the size of which is dependent on the fineness of the spacing adjustment desired. A small pitch is required when fine adjustments are necessary while a larger pitch can be used when only a coarser adjustment is required. Hexagonal head 26 is provided with a spacing face 28. Tapped into spacing bolt 24 from face 28 is a threaded opening 29 having a diameter smaller than that of shank 25.

Face 28 of bolt 24 abuts reference face 17 of member 12 and is locked in this position by a locking bolt 31 and a lock washer 32 which abuts face 18 of cam track 12. Locking bolt 31 is a hexagonal-head bolt having a threaded shank 33 and a head 34. Shank 33 has on it external threads 35. Shank 33 is inserted through lock washer 32, then through opening 20 in cam track 12 and is then threaded into opening 29 of bolt 24 to lock cam track 12 against spacing face 28 of spacing bolt 24.

Threads 35 of bolt 31 are, as shown in Fig. 1, of opposite hand to threads 27 of bolt 24, although if desired, they can be of the same hand as shown in Fig. 2 wherein threads 35' and threads 27' are of the same hand.

Operation of the device is as follows in order to space surfaces 14 and 17 a predetermined distance apart and to lock members 11 and 12 in such spaced relation. To adjust precisely the distance between reference faces 14 and 17, bolt 24 is threaded through opening 19 and into nut 21 as previously described until the distance between spacing face 28 of bolt 24 and face 14 of bracket 13 is the predetermined distance referred to. Member 12 is then positioned with reference face 17 in contact with spacing face 28. Shank 33 of locking bolt 31 is then inserted through washer 32 and opening 20 as previously described and threaded into opening 29 in spacing bolt 24. By means of a wrench (not shown), locking bolt 31 is then tightened to lock member 12 to spacing face 28 of bolt 24. Lock washer 32 prevents loosening due to vibrations and the distance between faces 14 and 17 is precisely determined and held.

It is to be understood that various modifications and changes may be made in this invention without departing from the spirit and scope thereof as set forth in the appended claims.

What is claimed is:

1. A fastener for locking a first member and a second member in spaced relation relative to each other, said fastener comprising a spacing bolt having at one end a shank adapted to be threaded into the first member and having at the other end a head adapted to be spaced from the first member and to abut one side of the second member, and a locking bolt having a shank adapted to pass freely through the second member and to be threaded into said spacing-bolt head, said locking bolt having a head adapted to abut the other side of the second member and lock the second member against the spacing-bolt head.

2. A fastener for locking a first member and a second member in spaced relation relative to each other, said fastener comprising a spacing bolt having at one end a shank adapted to be threaded into the first member and having at the other end a head adapted to be spaced from the first member, said head having a substantially flat, transverse reference face adapted to abut and locate one side of the second member, and a locking bolt having a shank adapted to pass freely through the second member and to be threaded into said spacing-bolt head and having a head adapted to abut the other side of the second member and lock the second member against the spacing-bolt head.

3. A fastener for locking a first member and a second member in spaced relation relative to each other, said fastener comprising a spacing bolt having at one end a shank provided with threads of one hand adapted to be screwed into the first member and having at the other end a head adapted to be spaced from the first member, said head having a substantially flat, transverse reference face adapted to abut and locate one side of the second member, and a locking bolt having a shank adapted to pass freely through the second member and provided with threads of the same hand as the spacing-bolt shank and adapted to be screwed into said spacing-bolt head and having a head adapted to lock the second member against the spacing-bolt head.

RAYMOND KARVIS.

REFERENCES CITED

The following references are of record in the file of this patent:

UNITED STATES PATENTS

| Number | Name | Date |
| --- | --- | --- |
| 47,031 | Moore | Mar. 28, 1865 |
| 1,480,686 | Light | Jan. 15, 1924 |
| 2,092,207 | Foss | Sept. 7, 1937 |

FOREIGN PATENTS

| Number | Country | Date |
| --- | --- | --- |
| 88,726 | Switzerland | Apr. 1, 1921 |
| 421,989 | France | Mar. 9, 1911 |